United States Patent
Joos et al.

(10) Patent No.: US 8,014,933 B2
(45) Date of Patent: Sep. 6, 2011

(54) METHOD TO DETERMINE A FUEL COMPOSITION

(75) Inventors: Klaus Joos, Walheim (DE); Georg Mallebrein, Korntal-Muenchingen (DE); Federico Buganza, Nonantola (IT); Carlos Koster, Campinas (BR); Helerson Kemmer, Vaihingen (DE); Kai Jakobs, Filderstadt (DE); Juergen Pfeiffer, Pforzheim (DE); Emilie Hincker-Piocelle, Ludwigsburg (DE); Werner Haeming, Neudenau (DE); Pierre-Yves Crepin, Stuttgart (DE)

(73) Assignee: Robert Bosch GmbH, Suttgart (DE)

( * ) Notice: Subject to any disclaimer, the term of this patent is extended or adjusted under 35 U.S.C. 154(b) by 407 days.

(21) Appl. No.: 12/174,918

(22) Filed: Jul. 17, 2008

(65) Prior Publication Data

US 2009/0070017 A1    Mar. 12, 2009

(30) Foreign Application Priority Data

Jul. 23, 2007   (DE) ........................ 10 2007 034 189

(51) Int. Cl.
*F02B 13/00* (2006.01)
*F02P 5/00* (2006.01)
(52) U.S. Cl. ...................................... 701/111; 123/575

(58) Field of Classification Search .................. 701/111; 123/575, 299, 300, 436, 406.21, 406.29, 123/406.31, 406.37, 198 A
See application file for complete search history.

(56) References Cited

U.S. PATENT DOCUMENTS

| 6,968,825 B2 * | 11/2005 | Hitomi et al. ............ 123/406.11 |
| 2005/0268886 A1 * | 12/2005 | Etou et al. ................ 123/406.29 |
| 2006/0102146 A1 * | 5/2006 | Cohn et al. ............... 123/406.29 |

* cited by examiner

*Primary Examiner* — Mahmoud Gimie
(74) *Attorney, Agent, or Firm* — Merchant & Gould P.C.

(57) ABSTRACT

The invention deals with a method to determine the fuel composition of a fuel mixture from a first fuel and a second fuel for the operation of an internal combustion engine, wherein the first and the second fuel have different octane numbers and wherein the internal combustion engine has at least one knock sensor and a closed-loop knock control. Provision is made according to the invention for the composition of the fuel mixture to be determined by means of an output signal of the knock sensor. Provision is made in many cases for the knock sensor to already be in the internal combustion engine, so that it does not present any additional expenditure of money or effort. Because the octane number of the fuel mixture is determined by the mixing ratio of the fuels involved, which have different octane numbers, in retrospect the composition of the fuel mixture can be suggested from the signal of the knock sensor under suitable operating conditions.

7 Claims, 3 Drawing Sheets

METHOD TO DETERMINE A FUEL COMPOSITION

TECHNICAL FIELD

The invention deals with a method to determine the fuel composition of a fuel mixture from a first fuel and a second fuel for the operation of an internal combustion engine, wherein the first and the second fuel have different octane numbers and wherein the internal combustion engine has at least one knock sensor and a closed-loop knock control.

BACKGROUND

Internal combustion engines on the basis of gasoline engines are generally operated with fuel from hydrocarbons, from fossil fuels based on refined crude oil. Ethanol produced from renewable resources (plants) or another kind of alcohol is increasingly being added in various mixing ratios to the fuel. In the USA and Europe a mixture of 75-85% ethanol and 15-25% gasoline is often distributed under the trade name E85. The internal combustion engines are designed in such a way that they can be operated with pure gasoline as well as with mixtures up to E85. This is denoted as a "flex-fuel operation". The operating parameters in the flex-fuel operation have to be adapted in each case to the existing fuel mixture for an efficient operation with only a small discharge of toxic emissions; while at the same time high engine performance is guaranteed. A stoichiometric fuel-air mixture ratio is, for example, present at 14.7 mass parts of air per part of gasoline; however, when using ethanol, a proportion of air of 9 mass parts must be set. Fuels with different percentages of ethanol with respect to gasoline have a different octane number. For example, high test gasoline has a ROZ (research octane number) of at least 95, while pure ethanol has a ROZ of at least 108. Mixtures of both types have ROZ numbers lying between the two values. This means that both types of fuel and the mixtures produced from them have a significantly different knock behavior. This must be taken into consideration during the operation of the internal combustion engine in order on the one hand to achieve a good degree of efficiency and on the other hand to avoid damage to the internal combustion engine. Small and/or slow changes in the alcohol content can be detected and taken into account by the engine management system of the internal combustion engine by means of a lambda probe and/or a knock sensor. Rapid changes with a significant deviation in the composition of the fuel mixture can however occur, for example, after filling the tank (fueling). If the internal combustion engine were operated with 100% gasoline and filled with E85 when the tank was close to empty, problems in starting and disturbances in the combustion can arise, which can also increase the harmful exhaust gas emissions. According to the state of the art, such rapid changes in the composition of the fuel can be detected using an ethanol sensor. This component, however, increases the cost of the internal combustion engine.

It is the task of the invention to provide a method, which allows for a reliable, cost effective detection of the composition of a fuel mixture from gasoline and ethanol or of another fuel mixture from fuels with different octane numbers.

SUMMARY

The task of the invention is thereby solved, in that the composition of the fuel mixture is determined by means of an output signal of the knock sensor. Provision is made in many cases for the knock sensor to already be in the internal combustion engine, so that it does not entail any further expenditure of money or effort. The octane number of the fuel mixture is determined by the mixing ratio of the fuels involved, which have different octane numbers. Thus in retrospect, the composition of the fuel mixture can be suggested from the signal of the knock sensor under suitable operating conditions. This composition must be determined because the prevailing percentage of the fuel types determines not only the knock behavior but also the lambda value to be preset and additional operating parameters.

If the composition of the fuel is determined for an average displacement of the ignition angle from the closed-loop procedure of the closed-loop knock control, the composition of the fuel mixture can be determined in a few operating cycles of the internal combustion engine. The composition of the fuel mixture can also alternatively be determined from an absolute ignition angle. The absolute ignition angle is thereby a preset ignition angle minus an ignition retardation by the closed-loop knock control.

If the composition of the fuel mixture is determined by establishing a preset ignition angle from an assumed composition of the fuel mixture and by establishing a correction of the composition of the fuel mixture from the closed-loop control procedure of the closed-loop knock control, a smaller closed-loop control intervention of the closed-loop knock control can be sufficient as a result. While, without a presetting of the ignition angle on the basis of an assumed composition of the fuel mixture, the closed-loop knock control has to start from the fuel mixture, which is insensitive to knocking, with, for example, 108 ROZ and has to compensate for the ignition retardation due to the greater knock tendency of fuel with, for example, ROZ 95 as well as for environmental conditions and engine tolerances, a prior determination of a preset ignition angle can result in the closed-loop knock control only having to compensate for environmental conditions and engine tolerances. Typically the closed-loop knock control has to correct retardations of more than 20 degrees with regard to the angle of crankshaft rotation during the first procedural approach; while during application of the second procedural approach, typically a retardation of maximally 10 degrees with regard to the angle of crankshaft rotation is sufficient.

A reliable determination of the composition of the fuel mixture is especially possible if the operating temperature of the internal combustion engine exceeds a minimum value and on the other hand is not too high because in such an instance, the internal combustion engine tends to knock during operation with a low as well as with a high percentage of ethanol. Also when the ambient temperature is too high, knocking occurs at a low as well as at a high percentage of ethanol in the fuel mixture. For this reason, it is overall advantageous if the composition of the fuel mixture is determined when the operating temperature of the internal combustion engine is located in a predetermined range and/or the ambient temperature does not exceed a predetermined value and/or the rotational speed of the internal combustion engine lies in a predetermined range.

Provision is made in a variation of the method, which is both reliable and especially resilient to interferences, for the composition of the fuel mixture to be determined in such a way, that in a first step an average retardation of the ignition angle is acquired, and in a second step a reaction of the closed-loop knock control to an advance of the ignition angle is acquired. In so doing, an average ignition angle retardation of the closed-loop knock control is denoted for all cylinders during a closed-loop ignition angle control of each individual cylinder.

An additional improvement of the reliability of the determination of the composition of the fuel mixture can be achieved, in that a value of the fuel composition determined from the closed-loop knock control is used for the plausibility of a value of the fuel composition previously determined in an engine management system. This value can, for example be determined from an evaluation of an output signal of a lambda probe.

If the method according to the invention is used for the determination of the composition of a gasoline/ethanol fuel mixture, a cost effective determination of the ethanol content of the fuel mixture is possible because no additional ethanol sensor has to be employed. Moreover, the method for the plausibility of values of the ethanol content of the fuel mixture, which were acquired in other methods, can be employed.

BRIEF DESCRIPTION OF THE DRAWINGS

The invention is explained below using the examples of embodiment depicted in the Figures. The following are shown:

FIG. 1 shows a graphic depiction of the octane number of different gasoline/ethanol mixtures in an octane number diagram 10. An octane number of the respective gasoline/ethanol mixture on the octane number axis 11 is plotted along an ethanol percentage axis 12, which indicates the percentage of ethanol in the mixture. An octane number value 13 of a mixture with 70% ethanol is exemplary plotted, which has 101 octane (ROZ). Starting from pure high test gasoline with 95 octane, the octane number increases with an increasing percentage of ethanol up to that of pure ethanol at a value of 108 octane (ROZ).

Figure 1:
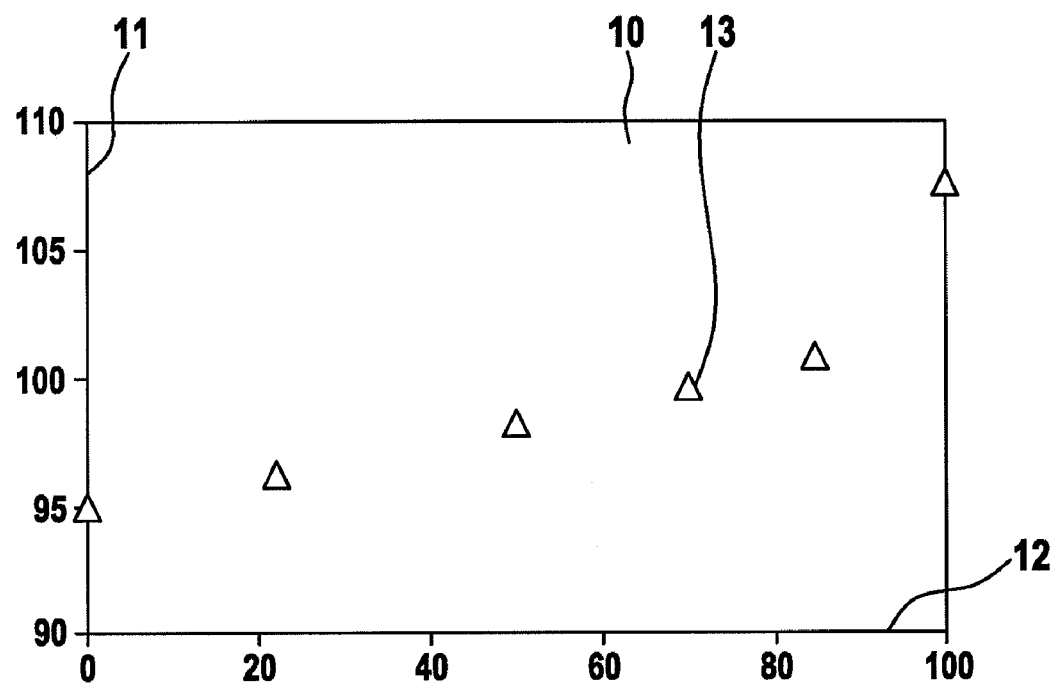
FIG. 1 is a depiction of the octane number of various gasoline/ethanol mixtures
Figure 2:
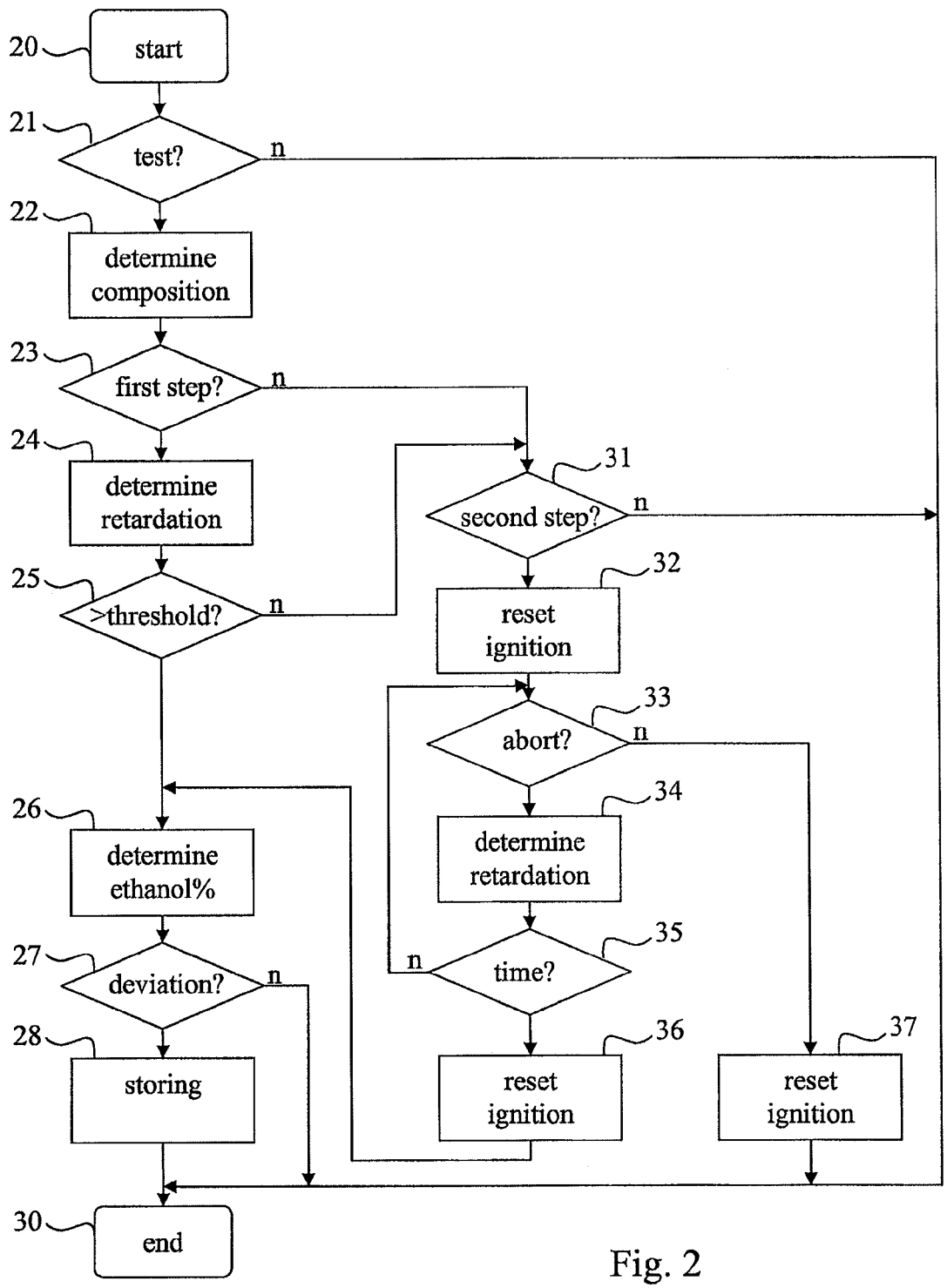
FIG. 2 is a flow diagram for the determination of the octane number of a fuel mixture

A flow diagram for the determination of the octane number of a fuel mixture is depicted in FIG. 2. In the depicted embodiment, the method according to the invention serves to test an already existing determination or estimation of an ethanol percentage in the fuel mixture. Proceeding forward from a start 20, a fueling test 21 is made to determine to what extent a filling of the tank (fueling) previously took place. If this is not the case, the procedure branches out to an end of the process 30. If the result of the fueling test 21 is positive, the percentage of ethanol in the fuel mixture is determined in a fuel composition determination 22. The fuel composition determination 22 can thereby take place by an evaluation of an output signal of a lambda probe. A test is made in a first condition 23 to determine to what extent the operating conditions of the internal combustion engine are suitable for beginning a first step of the method according to the invention. The operating temperature of the internal combustion engine has to lie in a specified range. On the one hand, the internal combustion engine must have a minimum operating temperature, so that the method delivers valid values. On the other hand, the operating temperature may not be too high, because otherwise knocking can occur when a low as well as a high percentage of ethanol exists in the fuel mixture. Furthermore, the ambient temperature may not be too high because knocking can also occur in this instance when a low or high percentage of ethanol exists in the fuel mixture.

If the first condition 23 is not met, the procedure branches out to a second condition 31, which represents a beginning of a second step of the method according to the invention. If the first condition 23 is met, a first ignition retardation determination 24 is performed from the reaction of a closed-loop knock control of the internal combustion engine. In this step, an amount of an average retardation is formed by the closed-loop knock control. The result of the ignition retardation determination 24 is compared with a predetermined threshold value in an ignition retardation threshold 25. If the threshold value is exceeded, the percentage of ethanol in the fuel mixture is determined from the amount of the average ignition retardation in a closed-loop knock control evaluation 26. If the threshold value is not exceeded, the procedure goes over to the second step of the method according to the invention; and a test is made in the second condition 31 to determine whether the operating temperature of the internal combustion engine and the ambient temperature exceed specified minimum values. When the values for the operating temperature and the ambient temperature are too low, the knock tendency of the fuel mixture is small at low as well as at high octane numbers; and the method according to the invention can not be implemented. For this reason, the procedure branches out in such a case to the end of the process 30.

After an advance of the ignition angle was previously performed, the ignition retardation is analyzed by the closed-loop knock control in the second step of the method. The advance of the ignition angle is set to zero in an ignition advance reset 32 and a time element is started, so that the maximum duration of the second step of the method is monitored. A check is made in an abort test 33 to determine to what extent the rotational speed of the internal combustion engine lies in a specified range, to what extent the engine load lies above a minimum value and to what extent the amount of the ignition retardation by the closed-loop knock control lies below a specified threshold value. The last condition serves the purpose of preventing frequent knocking at a low octane number. If all conditions are not met, the advance of the ignition angle is set back to zero via a ramp function in a second ignition advance reset 37, and the end of the process 30 is achieved. The resetting of the ignition advance takes place via the ramp function in order to maintain torque neutrality.

If all conditions of the abort test 33 are met, the ignition angle is displaced in stages in an "early" direction in a second ignition retardation determination 34; and the ignition retardation is determined by the closed-loop knock control. In each stage the time element, which monitors the duration of the procedure, is additionally increased. A check is made in the subsequent time test 35 to determine to what extent the intended maximum duration of the second step of the process is achieved. If the maximum duration is not achieved, the process branches out to the abort test 33, and subsequently the advance of the ignition angle is performed for an additional stage. If it is determined in a time test 35 that the intended maximum duration is achieved, the ignition advance is brought back via a ramp function in a first ignition advance reset 36. In the next step a value for the ethanol percentage in the fuel mixture is determined from the ignition retardation, which was determined in the second step of the method, by the closed-loop knock control in the closed-loop knock control evaluation 26.

In a deviation analysis 27, the value for the ethanol percentage in the fuel mixture from the analysis of the ignition retardation by the closed-loop knock control is compared with the value, which was ascertained in the fuel composition determination 22. If the difference between the two values lies under a specified threshold value, a value useful to the engine management system was able to be ascertained, and the end of the process 30 can be achieved. If the difference between the two values lies above a specified threshold value, it must be assumed that the value ascertained in the fuel composition determination 22 is not correct. This is stored in a plausibility unit 28; and after this, the end of the process 30 is achieved from this point.

Figure 3:
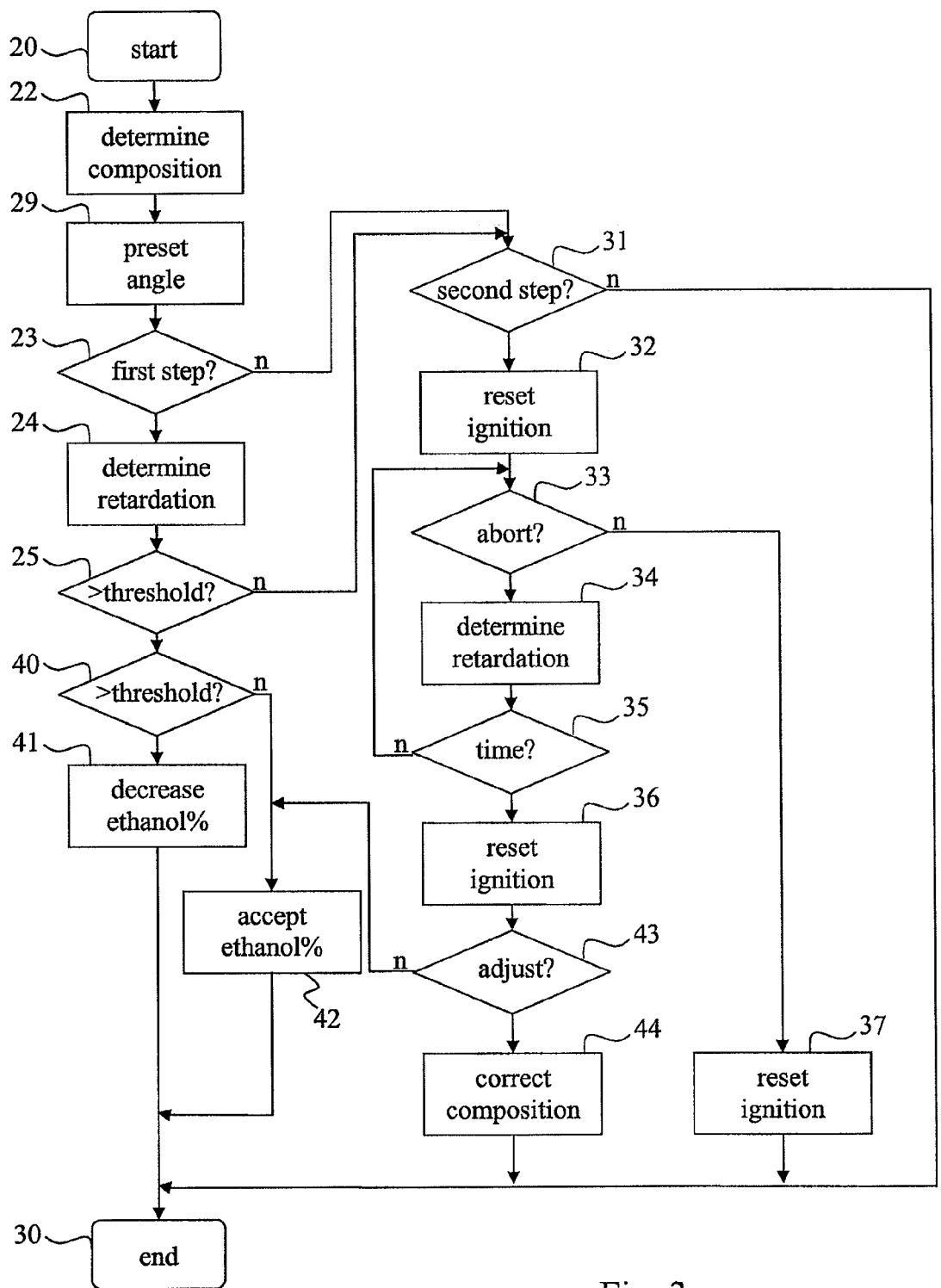
FIG. 3 is a flow diagram for the correction of an ethanol content determined in a forwardly displaced step

A flow diagram for the correction of a composition of the fuel mixture, which was determined in a forwardly displaced step, is depicted in FIG. 3. In this variation of the method a preset ignition angle is determined on the basis of an assumption about the composition of the fuel mixture, and the remaining deviation from the closed-loop knock control is offset. The assumption about the composition of the fuel mixture can then be corrected from the control signal of the closed-loop knock control, depending on whether the average ignition retardation indicates an ignition angle, which is too small or too large. In so doing, the first assumption about the composition of the fuel mixture can be met with the method described in FIG. 2; and in the second step, this assumption is refined. In FIG. 3, the denotations, which were already used in FIG. 2, are used for similar function blocks. The fuel composition determination 22 takes place after the start 20. After this a presetting of the ignition angle 29 occurs, in which a preset value for the ignition angle is determined as a function of the ethanol content of the fuel mixture, which was previously determined. As was the case in the variation according to FIG. 2, a test is made in the first condition 23 to determine to what extent the operating conditions of the internal combustion engine are suited to begin the first step of the method according to the invention.

After the check by the ignition retardation threshold 25, a test is made in an increased ignition retardation threshold 40 to determine whether a second predetermined threshold is exceeded, which is increased in relation to the one in the ignition retardation threshold 25 (and thereby even more significantly negative). If the increased ignition retardation threshold 40 is also exceeded, the assumed octane number of the fuel mixture was too high. An ethanol content of an ethanol/gasoline mixture, which was too high, was exemplary assumed during the determination of the preset ignition angle. In this case, the ethanol percentage, which was assumed for the composition of the fuel mixture, is decreased in a stage denoted as decrease in ethanol percentage 41, and the procedure proceeds to the end of the process 30. If the increased ignition retardation threshold 40 is not exceeded, the value currently assumed for the ethanol content is accepted into the engine management system in a step denoted as acceptance of ethanol percentage 42, and the procedure proceeds to the end of the process 30.

After the first ignition advance reset 36, the average ignition angle retardation of the closed-loop knock control, which arose as a result of the second ignition retardation determination 34, is compared with a predetermined threshold value in an adjustment value threshold 43. If the (negative) average ignition retardation remains below this predetermined threshold value despite the advance of the ignition angle, i.e. no significant negative value of the average ignition retardation arises, the octane number of the fuel mixture, which was assumed for the determination of the preset ignition angle, was too small. An ethanol percentage of an ethanol fuel mixture, which is too small, was exemplary assumed. The assumed ethanol percentage is then increased in a composition correction 44, and the preset ignition angle can correspondingly be corrected. If during the check, the adjustment value threshold 43 determines that the threshold has been exceeded, the assumed octane number and thereby in this example the assumed ethanol content of the gasoline/ethanol mixture were correct. Thus, the assumed ethanol percentage can be accepted into the engine management system in the step denoted as acceptance of ethanol percentage 42, and the procedure can achieve the end of the process 30.

The invention claimed is:

1. A method of determining a fuel composition of a fuel mixture from a first fuel and a second fuel for the operation of an internal combustion engine, wherein the first and the second fuel have different octane numbers and wherein the internal combustion engine has at least one knock sensor and a closed-loop knock control, the method comprising:
   determining if operation conditions of the internal combustion engine are suitable for determining the fuel composition of the fuel mixture, wherein an operating temperature of the internal combustion engine must exceed a minimum operating temperature but be below a predetermined operating temperature;
   determining the fuel composition of the fuel mixture with an output signal of the at least one knock sensor, when the operating temperature of the internal combustion engine exceeds the minimum operating temperature and is below the predetermined operating temperature.

2. A method according to claim 1, further comprising determining the fuel composition of the fuel mixture from a closed-loop control procedure of the closed-loop knock control for an average displacement of an ignition angle or an absolute ignition angle.

3. A method according to claim 1, further comprising ascertaining the fuel composition of the fuel mixture by a determination of a preset ignition angle from an assumed composition of the fuel mixture and by a determination of a correction of the composition of the fuel mixture from a closed-loop control procedure of the closed-loop knock control.

4. A method according claim 1, further comprising determining the fuel composition of the fuel mixture wherein at least one of the following operation conditions are satisfied:
   a. an ambient temperature does not exceed a predetermined value; or
   b. a rotational speed of the internal combustion engine lies in a predetermined range.

5. A method according claim 1, further comprising determining the fuel composition of the fuel mixture while an average retardation of an ignition angle is ascertained in a first step and a reaction of the closed-loop knock control to an advance of the ignition angle is ascertained in a second step.

6. A method according claim 1, further comprising determining a fuel composition value from the closed-loop knock control, wherein the value is used for the plausibility of a value of the fuel composition previously determined in an engine management system.

7. A method according to any one of the preceding claims, wherein the fuel mixture is a gasoline/ethanol fuel mixture.

* * * * *